United States Patent [19]

Renteria, Jr.

[11] 4,010,967
[45] Mar. 8, 1977

[54] GASOLINE TANK CLOSURE FOR A MOTOR VEHICLE

[75] Inventor: Isaac Renteria, Jr., Houston, Tex.

[73] Assignee: Lawrence Peska Associates, Inc., New York, N.Y. ; a part interest

[22] Filed: Jan. 21, 1976

[21] Appl. No.: 650,850

[52] U.S. Cl. .............................. 292/251.5; 292/1; 292/300; 240/52.15; 116/114 AE
[51] Int. Cl.² ......................................... E05B 19/18
[58] Field of Search ................... 292/300, 1, 251.5; 220/206, 230, 295, 296; 240/6.4 R, 52.15, 8.11; 116/114 AE; 70/244

[56] References Cited

UNITED STATES PATENTS

| | | | |
|---|---|---|---|
| 1,622,095 | 3/1927 | DeRoehn | 116/114 AF |
| 2,875,324 | 2/1959 | Camp et al. | 292/251.5 X |

FOREIGN PATENTS OR APPLICATIONS

| | | | |
|---|---|---|---|
| 409,143 | 9/1966 | Switzerland | 240/52.15 |

*Primary Examiner*—Richard E. Moore
*Attorney, Agent, or Firm*—Allen D. Brufsky

[57] ABSTRACT

A closure for a gasoline tank or radiator of an automobile having a permanent magnet for securing the closure to an adjacent portion of the vehicle upon removal so it will not be lost. The closure also includes a flashing light which is activated upon removal of the closure to remind a service station attendant to replace it.

8 Claims, 4 Drawing Figures

GASOLINE TANK CLOSURE FOR A MOTOR VEHICLE

BACKGROUND OF THE INVENTION

This invention relates to a closure, and more particularly a closure for a gasoline tank or a radiator of an automobile.

Often, when a gasoline station attendant removes a gas cap or radiator cap from an automobile he neglects to replace it. The driver does not miss the cap until the next time he buys gasoline or has the water checked in the radiator. The closure of this invention solves this problem and includes means for attaching the cap to a convenient portion of the vehicle, when it is removed, and if not replaced after the gasoline tank or radiator is serviced, it will emit a visual signal to indicate this fact.

SUMMARY OF THE INVENTION

Accordingly, it is an object of this invention to provide a gas tank or radiator closure for an automobile having a magnetic lining so that when the cap is removed and laid upon a convenient portion of the vehicle it will be held in place by magnetic force, and if not replaced, the cap will remain attached to the vehicle and not dislodged.

A further object of this invention is to provide a closure of the character indicated which includes a light which will emit a blinking visual signal once it is removed from the gas tank or radiator to remind a gasoline station attendant to replace it.

The closure of the present invention consists of:
- a cylindrical body having a top and a bottom wall, adapted to be attached to an automobile gas tank or radiator,
- a light secured to the top wall, and
- electrical circuit means within the cylindrical body between the top and bottom walls for activating the light in response to removal of the closure from the automobile gas tank or radiator,
- a permanent magnet within the cylindrical body for attaching the closure to a convenient portion of the automobile when removed from the gas tank or radiator.

BRIEF DESCRIPTION OF THE DRAWING

Further objects and advantages of the invention will become more apparent from the following description and claims, and from the accompanying drawing, wherein:

DETAILED DESCRIPTION OF THE PREFERRED EMBODIMENT

Figure 1:
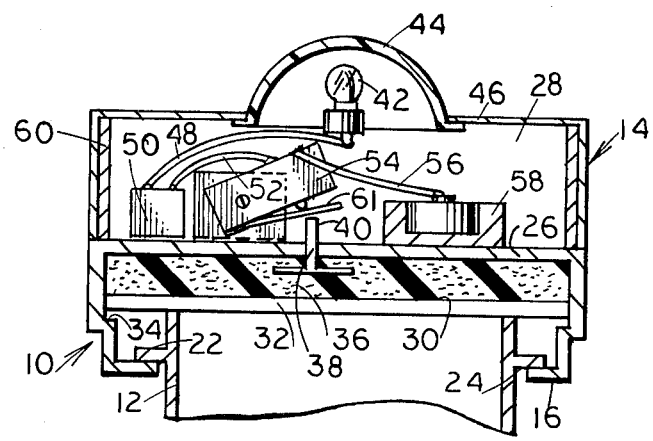
FIG. 1 is a longitudinal cross-sectional view of the closure of the present invention secured to the filler neck of an automobile gas tank.
Figure 2:
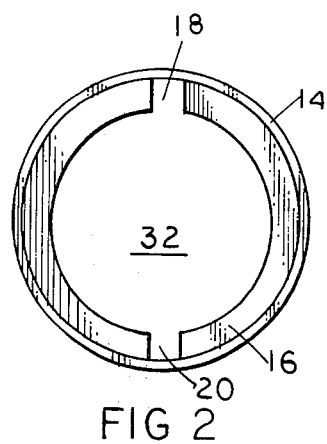
FIG. 2 is a bottom plan view of the closure shown in FIG. 1.
Figure 3:
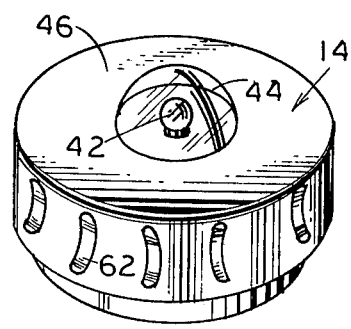
FIG. 3 is a perspective view of the closure shown in FIG. 1.

Referring now to the drawing in detail wherein like numerals indicate like elements throughout the several views, a closure 10 for an automobile gas tank or radiator is shown in FIG. 1 secured to the filler neck 12 of an automobile gas tank.

Closure 10 includes a steel cylindrical body 14 including an inwardly extending annular lip 16 at the bottom thereof. Lip 16 is interrupted to form radial slots 18, 20 adapted to receive therethrough the radial flanges 22, 24 extending outwardly from filler neck 12. It will be understood that when flanges 22, 24 are received through slots 18, 20 and the closure 10 rotated or twisted, so that annular lip 16 is below flanges 22, 24, closure 10 cannot be removed from filler neck 12.

Cylindrical body 14 includes a central disc 26 which divides its interior into an upper and lower chamber 28, 30, respectively. A second, lower pre-floating disc 32 normally seated on an annular shoulder 34 in lower chamber 30 forms a bottom wall for chamber 30. Sandwiched between disc 26 and 32 in lower chamber 30 is a compressible, sponge rubber mass 36 which serves as a seal and a compressible spring for a purpose described hereinafter. A plunger 38 is fixed within compressible sponge rubber spring 36 and has a vertical rod 40 slideably extending through an opening in central disc 26 into the upper chamber 28.

Upper chamber 28 has a grounded light 42 covered by a transparent, plastic dome 44 mounted in the top wall 46 of cylindrical body 14. A wire 48 electrically connects light 42 to an interruptor relay device 50, which is also grounded and connected by a wire 52 to a normally open microswitch 54. Microswitch 54 is electrically connected via a wire 56 to a grounded battery 58. An annular, permanent magnetic lining 60 extends about the cylindrical wall of body 14 between top wall 46 and central disc 26 to complete the construction of the upper chamber 28.

Figure 4:
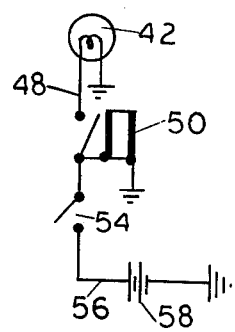
FIG. 4 is an electrical schematic diagram of the operation of the electrical components of the closure.

In use, when closure 10 is removed from gas tank filler tube 12, compressed sponge rubber spring 36 will expand until bottom disc 32 is seated on annular shoulder 34. Expansion of spring 36 will cause vertical rod 40 of plunger 38 to move downwardly out of pressing engagement with spring arm contact 61 of microswitch 54, to close switch 54. As shown in FIG. 4, closing of switch 54 will activate interruptor relay 50 to cause light 42 to blink or flash to visually indicate removal of closure 10. When replaced on tube 12, disc 32 in contact with the top of tube 12 will recompress spring 36, causing rod 40 to rise to press spring arm contact 61 to open switch 54 and deactivate light 42. Magnetic lining 60 magnetizes the surrounding walls of closure 10 so that it may be conveniently held on an adjacent vehicle surface when removed.

The cylindrical body 14 of closure 10 may also have detents 62 formed therein to enable closure to be gripped.

I claim:

1. A closure for an automobile gas tank or radiator comprising:
   - a cylindrical body having a top and a bottom wall adapted to be attached to an automobile gas tank or radiator,
   - a light secured to said top wall, and
   - electrical circuit means within said cylindrical body between said top and bottom walls for activating said light in response to removal of said closure from said automobile gas tank or radiator.

2. A closure in accordance with claim 1 including:
   - a permanent magnet within said cylindrical body for attaching said closure to a convenient portion of said automobile when removed from said gas tank or radiator.

3. A closure in accordance with claim 1 including:

a disc in said cylindrical body between said top and bottom walls dividing the interior of said cylindrical body into an upper and lower chamber, spring means between said disc and bottom wall in said cylindrical body normally compressed when the bottom wall of said closure is attached to the automobile gas tank or radiator, but which expands when said closure is removed, a plunger in said lower chamber having a vertical rod extending through said disc into said upper chamber fixed to said spring means, and said electrical circuit means including:

a normally open switch in said upper chamber electrically connected between a source of electrical energy and said light in contact with the vertical rod of said plunger which when said spring means is compressed holds said switch in its normally open position, but when said spring means is expanded in response to removal of said closure from said automobile gas tank or radiator said vertical rod on said plunger is pulled away from said switch, closing said switch to activate said light.

4. A closure in accordance with claim 3 wherein said spring means comprises a compressible sponge rubber mass between said disc and bottom wall filling the lower chamber.

5. A closure in accordance with claim 4 wherein said bottom wall of said cylindrical body is a free-floating disc and said cylindrical body includes an annular shoulder for retaining said free-floating disc within said cylindrical body.

6. A closure in accordance with claim 1 wherein said electrical circuit means includes:

means for periodically interrupting said circuit to cause said light to flash upon removal of said closure from said automobile gas tank or radiator.

7. A closure in accordance with claim 6 wherein said interrupting means includes an electrical relay.

8. A closure in accordance with claim 1 including a dome secured to the top wall of said cylindrical body around said light.

* * * * *